Feb. 27, 1973  A. L. FREEDLANDER ET AL  3,717,985
MOWER BLADE
Filed Aug. 21, 1968
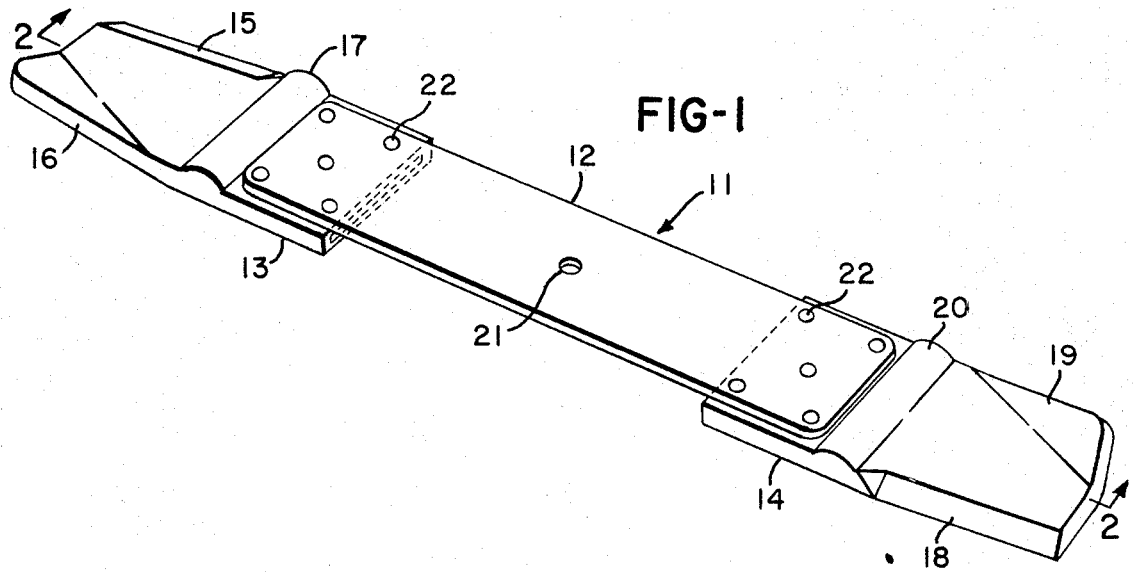
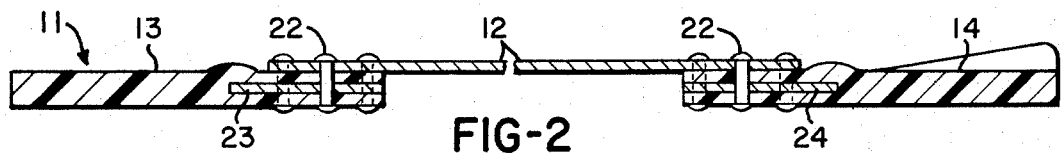
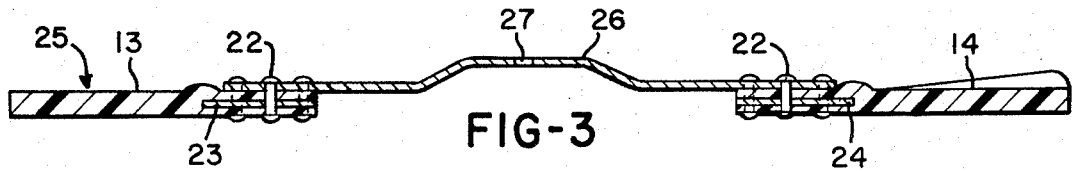
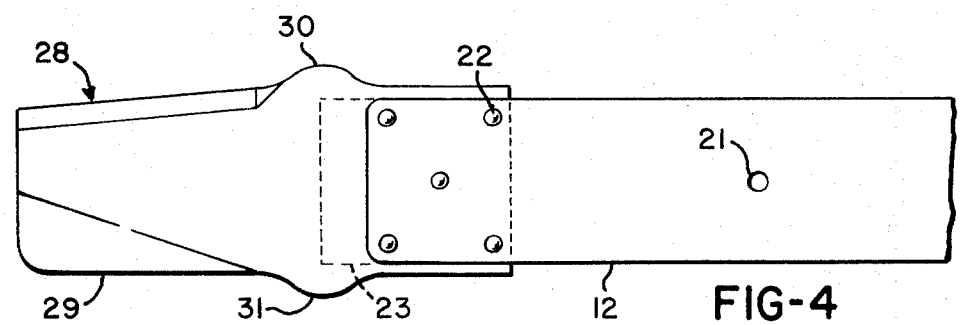
INVENTOR
ABRAHAM L. FREEDLANDER
WAYNE C. GARRETT
ROBERT E. MATTHEWS
BY
Reuben Wolk
ATTORNEY

United States Patent Office 3,717,985
Patented Feb. 27, 1973

3,717,985
MOWER BLADE

Abraham L. Freedlander, Dayton, Ohio, and Wayne C. Garrett and Robert E. Matthews, Waynesville, N.C., assignors to Dayco Corporation, Dayton, Ohio
Filed Aug. 21, 1968, Ser. No. 754,433
The portion of the term of the patent subsequent to Apr. 29, 1986, has been disclaimed
Int. Cl. A01d 55/18
U.S. Cl. 56—295                 3 Claims

ABSTRACT OF THE DISCLOSURE

A flexible mower blade having cutting arms formed of an elastomeric material such as urethane and having a rigid insert within each arm terminating short of the cutting edges. The arms are secured to a rigid member which is mounted on the lawn mower shaft.

---

Conventional lawn mowers used by the average homeowner are usually rotary and are gasoline or electric motor operated. This type of mower is also popular for industrial mowing operations. The term "rotary" refers to a mower in which the shaft extends vertically downward from the housing and upon which the blade is mounted so that it rotates in a plane parallel to the ground. This type of mower is popular because it is simple to operate, inexpensive to build, and performs a highly satisfactory job of cutting grass and weeds. Unfortunately, however, the extremely high speeds at which such mowers rotate, up to 3600 r.p.m., create serious hazards. For example, there have been many cases where the operator's foot has accidentally slipped under the housing and has been struck by the rotating blade, causing serious injury to, and even amputation of, the foot. In addition, the conventional metal cutting blade may strike large rocks, posts, or other objects in the lawn, and the sudden shock may cause the blade to break, hurling pieces of metal at tremendous speeds to cause injury to the operator or to the persons close by. When a rigid metal blade strikes loose stones and other foreign objects, they are thrown great distances and may create damage to persons or property. A further disadvantage of the conventional metal blade used in the rotary mower is its tendency to dull very quickly so that it must be resharpened frequently for maximum efficiency.

The present invention is designed to overcome the many disadvantages recited above, while at the same time retaining the advantages of the rotary type blade. The invention utilizes a blade having arms somewhat similar to those of a metal blade, but made of an elastomeric material that is sufficiently rigid to cut grass as efficiently as a metal blade, and yet sufficiently flexible to permit the blade to flex when striking an object such as a shoe, which encases the operator's foot. This flexing action permits the blade to ride over the object and thus avoid serious damage to the foot. This flexing is also useful if an immovable object, such as a large rock or post, is encountered, since the blade tends to flex and ride over this object at the same time. The blade has a certain amount of inherent elasticity that tends to cushion the initial shock and prevent the blade from breaking. When striking loose stones or other small objects, the flexing action will somewhat cushion the initial impact and reduce the amount of speed at which these small objects are hurled. The novel blade also has the ability to flex repeatedly without destroying any of its desirable properties, and also retains a cutting edge a remarkably long time. The material utilized also has the properties of elongating only a very small amount during operation and yet has sufficient elastic memory to return to its original size despite many hours of use. Despite the fact that it is elastomeric, the blade itself does not get softer during operation, but retains its initial properties that provide an excellent compromise between sufficient rigidity for cutting and sufficient flexibility for safety. The blade is also extremely simple to manufacture and moderate in cost.

In our earlier Pat. No. 3,343,350, we have described a similar blade made completely of a urethane elastomer, and having separate reinforcing members to provide additional support and mounting. In that patent, the reinforcing members formed a full sandwich with the blade. As a further improvement, our copending application Ser. No. 816,166 which is a continuation of Ser. No. 625,802 describes a blade made primarily of a urethane elastomer, but having a rigid central mounting blade embedded within the elastomer for mounting the blade upon the drive shaft.

The present invention represents a further variation of the blades described in the above patent and application in that the arms are separated and mounted on a rigid central bar in such a way that these arms may be easily replaced. Further, the use of these individual arms reduces the amount of elastomer which would otherwise be required. In addition, the rigid central bar tends to reduce the elongation of the elastomeric material, controls the twisting torque of the cutting area, and also affects the up and down deflection of the tips.

The novel blade described herein also represents an improvement over other prior art devices which have utilized replaceable arms. For example, Beeston, U.S. Pat. No. 2,869,311 has plastic cutting members secured to a mounting member, which are not flexible and which are not mounted in the same manner. Kirk, U.S. Pat. No. 3,320,-732 provides a disc having pivoted cutting members. There are other important advantages to this novel blade. For example, conventional metal blades used for agricultural purposes are very long—as much as 42 inches. It has been found that such a long mass of steel creates tremendous vibrations, and that our novel design tends to overcome these vibrations.

The specific embodiments of the invention are described in the following specification and claims, and illustrated in the drawings, in which:

FIG. 1 is a perspective view of a preferred form of the novel blade.

FIG. 2 is a cross-section view of the blade taken along lines 2—2 of FIG. 1.

FIG. 3 is a view similar to FIG. 2, illustrating a modified form of the blade.

FIG. 4 is a partial top view of another form of blade.

Referring to the drawings, FIG. 1 illustrates a lawn mower blade 11 which is generally flat and rectangular and has a rigid mounting bar 12 and outwardly extending arms 13 and 14 which are fixedly mounted on the ends of the bar to form a unitary member. The arms are longitudinally aligned with the bar but are offset from the plane of the bar, and extend beyond the ends as shown. These arms are principally composed of an elastomer, and preferably of a urethane elastomer such as more fully described in our patent and copending application referred to above, of the type which may be molded or cast and formulated from a polyester or polyether based isocyanate terminated prepolymer. The central mounting bar 12 is made of metal or a rigid plastic material such as nylon, polycarbonate, polystyrene, polyacetal, or the like. An aperture 21 in the center of the bar permits mounting on the shaft of a lawn mower and the use of the appropriate hardware for mounting. The aperture 21 may be made with a diameter which is required to fit the smallest of the lawn mowers on the market, so that it is only necessary for the user to drill this hole out to a larger diameter if required for his particular mower. The bar which is illustrated provides a solid mounting member on the blade and at the same time provide stiffness and minimizes longitudinal stretch.

The arm 13 has a cutting edge 15 and an upturned trailing edge 16 which is opposite the cutting edge, and the arm 14 similarly has a cutting edge 18 and an opposite upturned edge 19. Imbedded within the arms 13 and 14 are rigid reinforcing plates 23 and 24. These plates extend to the inner edges of the arms, but terminate short of the cutting edges, as best shown in FIG. 2. Above the outward edges of these plates are curved reinforcing humps 17 and 20, located on the upper surfaces of the arms, the humps tending to prevent tear-out. The ends of the plates 23 and 24 are located approximately at the centerline of the humps. It should be understood that if desired these humps may be on the lower surfaces, or on both surfaces, of the arms.

The arms are secured to the lower surface of the bar 12 by means of rivets 22 which are driven through the reinforcing plates 23 and 24, and through the elastomeric material as well to provide a solid bond. In lieu of rivets, other conventional fastening means, such as nuts and bolts, may be used. If desired, the arms may be secured to the upper surface of the bar 12 instead of the lower surface. When the cutting edges have become excessively worn, it is only necessary to drive out the rivets 22 and put a new set of arms on the bar.

FIG. 3 illustrates a modification in which the blade 25 has the same arms 13 and 14, but the central bar 26 is offset as shown. The mounting is done through hole 27. The arms are secured to the ends of the bar 26 exactly as described above, so that the arms are offset from the plane of the ends of the bar.

FIG. 4 illustrates a further modification in which a blade 28 has the central bar 12, but the cutting arm 29 is different. In lieu of a reinforcing hump, a pair of ears 30 and 31 on the edges of the arm 29 are used for purpose of reinforcing the end of the plate 23.

Other modifications are contemplated; for example, the central plate may be coated with a thin layer of elastomer similar to the arms to minimize rusting.

We claim:

1. In a lawn mower having a rotatable shaft and a cutting blade mounted thereon, said blade comprising a rigid central mounting bar and a pair of separate flexible elastomeric cutting arms fixedly mounted on and extending outwardly beyond the ends of said bar, said arms being longitudinally aligned with but offset from the plane of the ends of said bar and having rigid reinforcing members embedded therein, and assembly means passing through said bar, said arm, and said member.

2. The mower of claim 1 in which said arms are composed of a flexible urethane elastomer.

3. The mower of claim 1 in which said arms are mounted below said bar.

References Cited

UNITED STATES PATENTS

| 2,869,311 | 1/1959 | Beeston, Jr. | 56—295 |
| 3,320,732 | 5/1967 | Kirk | 56—295 |
| 3,321,894 | 5/1967 | Ingram | 56—295 |
| 3,388,540 | 6/1968 | Michaud | 56—295 |
| 3,440,808 | 4/1969 | Freedlander et al. | 56—295 |
| 3,302,377 | 2/1967 | Ely | 56—295 |
| 3,340,682 | 9/1967 | Ely | 56—295 |

LOUIS G. MANCENE, Primary Examiner

J. N. ESKOVITZ, Assistant Examiner